US008299895B2

(12) United States Patent
Harris

(10) Patent No.: US 8,299,895 B2
(45) Date of Patent: Oct. 30, 2012

(54) CELLULAR PHONE ENTRY TECHNIQUES

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 0 days.

(21) Appl. No.: 13/219,634

(22) Filed: Aug. 27, 2011

(65) Prior Publication Data

US 2011/0312273 A1 Dec. 22, 2011

Related U.S. Application Data

(63) Continuation of application No. 12/017,343, filed on Jan. 22, 2008, now abandoned.

(51) Int. Cl.
*H04B 7/00* (2006.01)

(52) U.S. Cl. .................... 340/5.72; 455/41.2; 455/569.1; 455/569.2; 340/426.1; 340/426.13; 340/5.61

(58) Field of Classification Search .................... 340/5.1, 340/5.2, 5.21, 5.22, 5.23, 5.6, 5.61, 5.63, 340/5.64, 5.72, 5.73, 5.8, 545.6, 541, 542, 340/991; 455/552.1, 41.1, 41.2, 41.3, 507
See application file for complete search history.

(56) References Cited

U.S. PATENT DOCUMENTS

| | | | | |
|---|---|---|---|---|
| 5,774,060 | A * | 6/1998 | Ostermann et al. | 340/5.61 |
| 6,381,699 | B2 | 4/2002 | Kochner | |
| 6,748,541 | B1 | 6/2004 | Margalit | |
| 6,763,399 | B2 | 7/2004 | Margalit | |
| 2003/0003892 | A1* | 1/2003 | Makinen | 455/345 |
| 2003/0137398 | A1 | 7/2003 | Shibata et al. | |
| 2004/0066092 | A1* | 4/2004 | Muller | 307/10.1 |
| 2004/0263316 | A1 | 12/2004 | Dix et al. | |
| 2006/0094461 | A1* | 5/2006 | Hameed et al. | 455/552.1 |
| 2006/0208856 | A1 | 9/2006 | Nakashima et al. | |
| 2006/0220847 | A1* | 10/2006 | Lanigan et al. | 340/545.6 |
| 2007/0200671 | A1 | 8/2007 | Kelley et al. | |
| 2007/0290792 | A1 | 12/2007 | Tschimochi et al. | |
| 2009/0163140 | A1 | 6/2009 | Packham et al. | |
| 2010/0141381 | A1 | 6/2010 | Bliding et al. | |

* cited by examiner

*Primary Examiner* — Nabil Syed
(74) *Attorney, Agent, or Firm* — Law Office of Scott C. Harris, Inc.

(57) ABSTRACT

A cell phone is mated with the vehicle system and thereafter used to obtain access to the vehicle. A user who has a cell phone automatically can obtain access to the vehicle. An embodiment describes a USB key that provides access to the vehicle, and in an emergency, either a complete or partial version of the key can be downloaded from a server.

17 Claims, 2 Drawing Sheets

CELLULAR PHONE ENTRY TECHNIQUES

CROSS-REFERENCE TO RELATED APPLICATIONS

This application is a continuation of Ser. No. 12/017,343 filed Jan. 22, 2008 of which this application claims priority under 35 U.S.C. §120.

BACKGROUND

Many automobiles have the capability to communicate with a cellular phone. For example, a cellular-phone may have Bluetooth capabilities that allow mating between the cellular-phone and the automobile so that the user of cellular phone can communicate through the automobile subsystems, e.g., use an in-vehicle microphone and/or speaker.

In addition, it is conventional to use a key to enter and drive the automobile. The key is for security, e.g., to prevent theft. However, keys can be lost. High security keys are often difficult to duplicate especially for the higher security keys. Keys are one more thing that a person needs to carry.

SUMMARY

The present application describes new ways of controlling access to an automobile.

One aspect describes use of a cellular phone to control access to the automobile. Different aspects describe different ways in which the access can be granted.

BRIEF DESCRIPTION OF THE DRAWINGS

These and other aspects will now be described in detail to the accompanying drawings in which.

DETAILED DESCRIPTION

A conventional way of obtaining access to an automobile is to use a key. In order to do this, the key is put into a key slot, sometimes turned or otherwise clicked into place.

Figure 1:
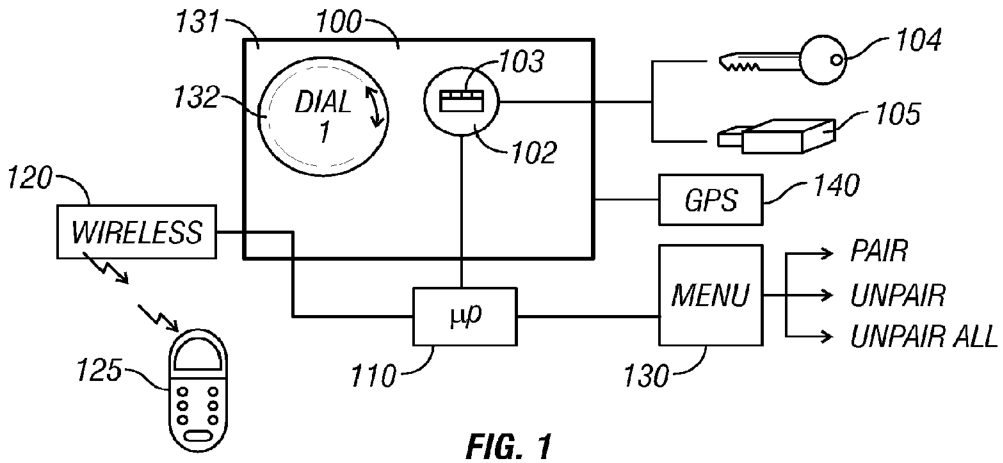
FIG. 1 shows a an entry system and its access to a computer in an automobile.

FIG. 1 illustrates an access control part 100 of an embodiment. The part 100 may be within an automobile, e.g. on the dashboard of the automobile. However, it should be understood that this can also be in any other part of the automobile, such as the door to the automobile that allows entry to the automobile from the outside. The access control part 100 includes a key slot 102 into which a key can be inserted.

Many automobiles operate using a controllable microprocessor. The microprocessor 110 is shown communicating with the key slot 102. In this embodiment, the key slot 102 may be sized and configured to accept and connect to a non volatile memory device, e.g., a USB key or other flash memory. The key slot 102 includes inner surfaces with contacts 103 that allow connection to the USB stick. In addition, however, a conventional key shown as 104 or other kind of keys such as laser cut key can also be fit into the same socket. In the embodiment, either a conventional key 104, or the USB key 105 can be put into the same hole, and either can be used to provide access to the vehicle, as explained herein.

Once either key is inserted in the proper way, an indication of authorized access is the processor 110. This allows access to the automobile systems. For example the access allows the automobile to be started, or the door to be opened, or different menus to be accessed. The processor 10 also controls connection to a wireless module 120. This wireless module may be, for example, a Bluetooth module that communicates with a number of different Bluetooth telephones such as 125. It may also be, however, any other format of wireless module.

The embodiment may also allow coupling with the different Bluetooth-enabled phones in a conventional way.

Figure 2:
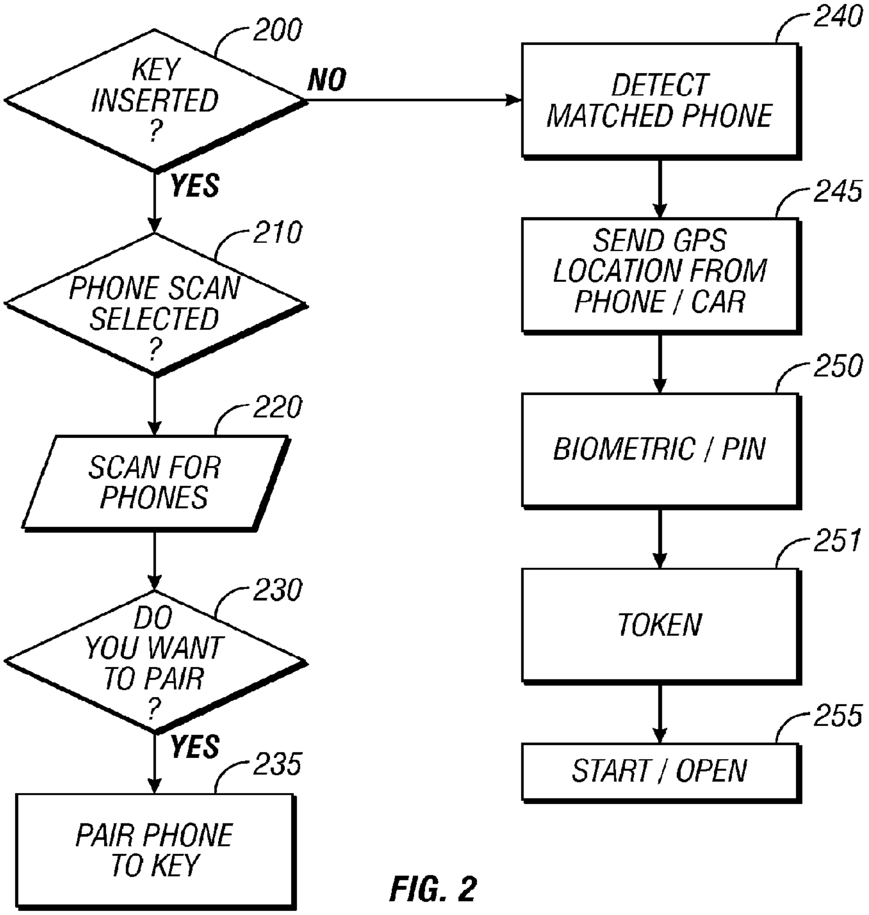
FIG. 2 shows a flowchart of operation.

FIG. 2 illustrates a flowchart that is carried out by the microprocessor 110. At 200, the key is inserted. This enables communication with the different subsystems in the automobile, for example, to allow entry into the automobile, and/or allow other functions. After access is granted based on the key being inserted at 200, one option at 210 may be the selection of a phone scan. This scans for phones in the vicinity at 220. When a phone is found at 220, 230 questions the user whether they want to pair the phone with the automobile. This pairing can only be done when the key is inserted, and therefore during a time when there is security (by virtue of the key having been inserted) that the authorized user is operating the vehicle. If the user selects pairing, when the phone is paired to the key at 235.

A limited function key may also be provided with the vehicle, for temporary uses such as valets and car loans. The limited function key allows access to the vehicle systems, but does not allow pairing. Therefore, the valet or other vehicle user cannot set their own cell phone to allow access to the vehicle.

After pairing has been carried out, the phone is detected to allow access to the vehicle even when the key is not inserted. The proximity of the cellphone is detected, and that proximity allows access to the vehicle systems.

The vehicle may include sensors for the phone both inside and outside of the vehicle to allow the phone (once paired) to be used for, in essence, keyless entry.

One embodiment may require at least one additional security aspect to be carried out in order to grant the access via cell phone only (without a key). Different alternative security techniques are described herein. Some are more conventional security techniques like biometrics and codes. Others are totally new security techniques that are specially adapted for use with a vehicle.

A first of these new techniques is shown as 245. Many vehicles, and virtually all cellphones, have GPS capability that allows determination of their specific location. The inventor noticed that determining and logging the location of a vehicle is a very strong indicia of security—since the location of the vehicle provides the ability to reclaim the vehicle. The automatically-obtained location, e.g., the GPS location from either the phone or the automobile is either sent or stored at 245. The location of the vehicle at the time of vehicle access is therefore logged by a remote server. The remote server that logs the location may be for example the automobile manufacturer's server, or may be via cell phone carrier, or may be for example the user's personal computer or e-mail address.

In one embodiment, a mobile server within the automobile sends an e-mail to the user's e-mail address any time the car is accessed using the mobile phone, including its location. Another embodiment keeps a log of vehicle locations when the car is accessed using the mobile phone. This minimizes the possibility of improper access, since the user running the automobile location is automatically logged.

In another embodiment, this technique of ensuring security using automatically-detected position, is used for security verification of some other function, other than unlocking using a cell phone.

Another way of verifying at 250 uses a biometric and/or a pin in addition to the cell phone proximity. Either the biometric or the pin can be entered using a keyboard associated with the vehicle, or on the keyboard or other entry device or part on the phone. For example, the user may be required to enter their pin on the phone, the digits of which are detected by the Bluetooth connection. A user may be required to take a picture or scan of a body part, such as a finger. This second layer of authentication can further identify the user, and can match with a prestored image or other information indicative of the user.

After detecting a matched phone, and, if selected, passing the additional security steps at 245/250, the car is started or opened at 255.

An advantage of this system is the capability of obtaining access to the automobile with their cellular phone. No additional key is necessary. Simply possessing the cellular phone, after the initial pairing, provides the user with the ability to enter the automobile without needing a special key.

Other functions can also be carried out on the menu. For example, the menu can be used to override electronic key (e.g., USB) access, for those who do not trust the USB key as a secure mode of access.

Optional additional security embodiments may also be used. For example, a key exchange system may be used between the phone and the automobile, so that all communications between the phone and the automobile is encrypted. This prevents man in the middle or other kinds of techniques, whereby unauthorized users can intercept the communication between the phone and the automobile, clone the phone or otherwise provide simulated phone information and then obtain access to the automobile.

Another embodiment may use a token type system running as an application in the phone, e.g., using the RSA token encryption system. For example, the token type system often starts with a specified seed, and uses that seed and real time clock to produce a number. The server, here the car, also has the seed, and also has the real time. Therefore, the car is able to determine from the number whether the proper seed has been used, and hence, whether the provided token is authorized. The automobile can hence determine if the token is correct. In the embodiment, part of the pairing may include transferring a unique token seed from the vehicle to the phone, or from the phone to the vehicle.

Another embodiment may require that the phone be connected via a wire to the vehicle for the initial pairing. Subsequent uses of the phone to obtain access can be wireless, but the initial pairing in this embodiment must be over a wire, e.g., a USB cable. This prevents a listener from obtaining the token information by eavesdropping.

After pairing, an interceptor of the token obtains no information that could be used to create a token at any other time.

The token is only good for a few minutes. For example, the token system may allow 1-5 minutes of leeway in their system between the times of the two real-time clocks to allow for drift between the clocks. After that few minutes has elapsed, the token number cannot be used again.

The token that is sent to the vehicle may be determined within the cellular phone in a way that is transparent to the cell phone user. The user might not even know that the token is being created. Other techniques may also be used to ensure that the actual cellphone that was paired, is later the one used to However, a man in the middle cannot clone the phone and steal or otherwise obtain access to the vehicle. Access requires the actual cellular phone, with its token and its unique seed therein.

Other techniques beside a token can be used; for example, any technique that verifies the cellphone hardware can be used for this purpose. The technique is preferably encryption based, but can use other techniques.

In an embodiment, the key is a code on a non-volatile device such as a USB key 105. The code on that key is verified by the automobile to allow starting or other access to the vehicle. This code can be a very large number, for example a 2048 byte number. If the code on the key matches to one or many codes within the automobile, then the car systems can be accessed; and the engine can be started.

This system may also use a biometric verification.

One advantage of this system is that when USB key is used as a key, it allows simplified copying of the key. The key can simply be put into a computer, and copied to another USB key into the computer. Therefore, user can easily make many copies. Also, if many different automobiles use a USB key, the USB key can store many different codes thereon. The same key can be used to control many different vehicles. For example, the key can have five different codes thereon, one of which may start the vehicle. A different one of the codes can be used to control and start some other vehicle. A single USB key, therefore, acts as a key to many different vehicles. The same key can also be used, for example, for entry to a house, or the like.

In another embodiment, the USB key may have a number thereon, and the car can be trained to accept that number in the same way it is trained to detect to accept a matched phone. In this way, the single number on the key can control many different vehicles. The number on the key may be rewritable, or may be fixed. In this embodiment, the key can be purchased with a fixed code, and the vehicle trained to operate using that key.

Another advantage of the USB key is that the code can be downloaded. If you lose or misplace your car key, you are not stranded: you can download a number that can be used to operate the vehicle. That can be either the actual number from the USB key, or a one time use temporary number.

The download may be from the user's own personal server, or from the automobile's server (run as a web appliance, for example), or from the automobile company's server. Once identifying yourself, the system allows download of a key that represents access to your vehicle. The key may be the real key, or may be a temporary key. Temporary keys may be made like tokens, where they are based on the unique seed in the server, and are valid for some limited period, e.g., 15 minutes or 2 hours.

Another embodiment teaches that when a lower security entry is obtained, for example when the key is downloaded, or when the cell phone is used for access, then the location of the vehicle is logged. One embodiment allows a limited location key to be downloaded. This downloaded key is specific to a specific location. In this embodiment, for example, a new key is requested including an indication of a location of the vehicle. For example—the request may indicate a location, or may be initiated from a location near the vehicle. The downloaded key is only good to access the vehicle at or near that location. The automobile has a GPS unit 140 therein. The key that is downloaded has a location coded therein. The vehicle checks its own location against the location in the downloaded key. The key cannot be used unless the location is correct or at least close to accurate. However, if the location is correct, then the key can be used for a certain period (e.g., one ride) even if the vehicle thereafter is moved.

Figure 3:
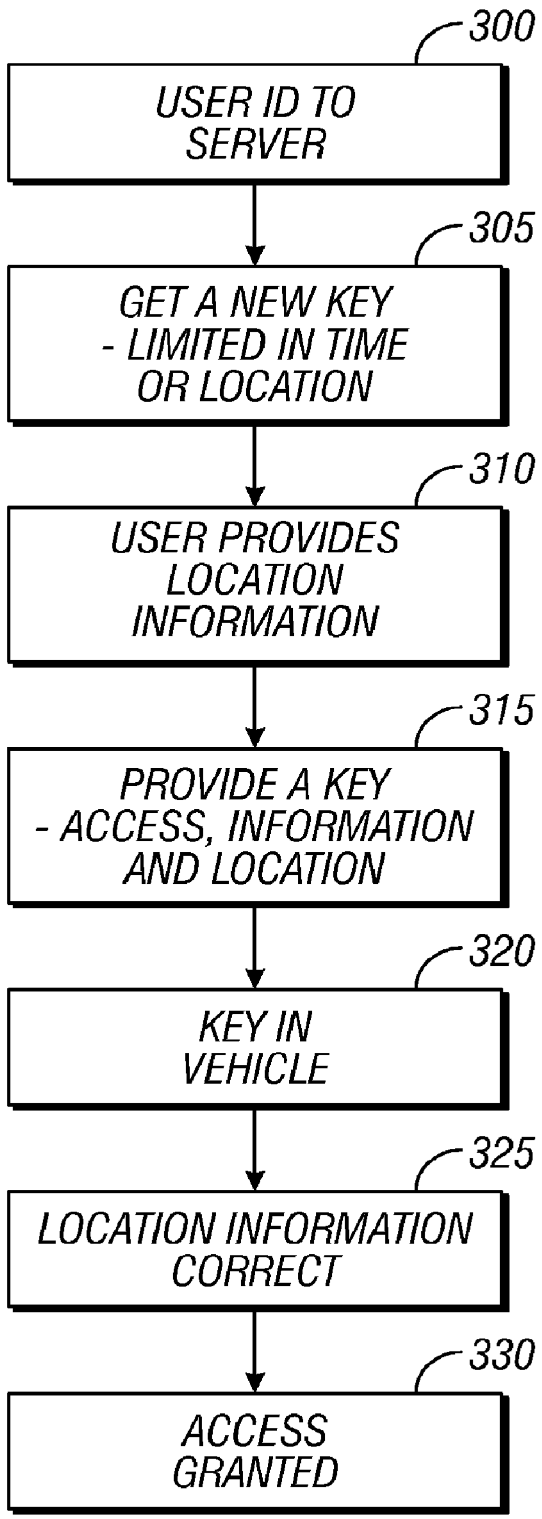
FIG. 3 shows a flowchart of access using a key.

FIG. 3 illustrates a flow chart of this embodiment. At 300, the user identifies themselves to a server. The server recognizes the credentials at 305, and allows the user to get a new key. In one embodiment, the new key is limited in some way. The new key may be limited in time and usable for only 3 to 15 minutes, for example, to start the vehicle. In another embodiment, the user provides their location information at 310. This could be done via GPS over cell phone, or may be done using a map or by entering address information. The location information is converted to GPS information. At 315, a key is provided that is combined with location information and is limited in the location where it can be used.

At 320, the user takes the key and uses it in the vehicle. The vehicle determines at 325 whether the actual location information correctly matches with the location information in the key. For example, in an embodiment, the user must be within 2000 feet of the entered location in order for the key to the accepted. This may use, for example, the GPS information in the automobile. If correct, access is granted at 330. The user having requested this information provides, therefore, the vehicle location. Therefore, the key is only good if it starts the car at a known location, requiring, therefore, that the vehicle location becomes known.

According to another embodiment, the keys can simply be downloaded, and are usable for some short amount of time without the location information. Another embodiment may allow the keys to be downloaded and to be maintained forever.

In this way, simply walking up to the vehicle with a cell phone in your pocket or on your person allows access to the vehicle systems including but not limited to door opening, and ignition access, same slot, memory or key.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other case sizes and shapes are intended to be encompassed. Other kinds of communicators beyond cell phones and blackberry type devices are contemplated. The electronic keys can be in any nonvolatile memory form—smart card, SD memory, FireWire memories, smart cards, as well as other flash memory, can be used for this purpose. Other vehicles beside automobiles may be controlled in this way.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The communicator described herein may include any kind of computer, either general purpose, or some specific purpose computer such as a workstation. The computer may be an Intel (e.g., Pentium or Core 2 duo) or AMD based computer, running Windows XP or Linux, or may be a Macintosh computer.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A vehicle with wireless entry capability, comprising:

a communication system, which communicates with a first key in a vehicle, by communicating with the first key in the vehicle and allowing access to the vehicle including entry into the vehicle and operating the vehicle based on said communicating with the first key in the vehicle, said communication system also including a wireless module that wirelessly communicates with at least one cellular phone, only while said communication system is communicating with the first key in the vehicle, allowing a user to pair a cellular phone with the vehicle, where said cellular phone is paired to the vehicle only while said vehicle is communicating with the first key in the vehicle and where said cellular phone cannot be paired to the vehicle while the vehicle is not communicating with the first key in the vehicle;

said communication system storing information indicative of said cellular phone that has been properly paired to the vehicle and subsequently detecting a proximity of said cellular phone and allowing said access to the vehicle based on detecting said cellular phone within range of said vehicle without communicating with said first key, wherein said communication system carries out said pairing by transferring information that represents a time of a request for access that was indicated by said cellular phone, using a clock running in the vehicle to determine whether the time indicated by said cellular phone matches to the time indicated by the clock in the vehicle, and allowing access only when the cellular phone has been previously paired to the vehicle, and the clock in the vehicle indicates the same time as the information from the request for access from the cellular phone.

2. A vehicle as in claim 1 wherein said first key is a full function key, and wherein said communication system further communicates with a second key which is not a full function key, where said communicating with said second key allows said access to the vehicle, but does not allow pairing a said cellular phone to the vehicle.

3. A vehicle as in claim 1, wherein a communication format of the cellular phone is Bluetooth.

4. A vehicle as in claim 1, wherein said pairing is carried out over a wire connection, and cannot be carried out wirelessly, and subsequent to said pairing, said access is allowed via a wireless connection.

5. A vehicle as in claim 1, wherein said vehicle includes a location detecting part that determines location, and automatically sends a communication to a remote computer indicative of said location, each time the vehicle is accessed using said cellular phone.

6. A vehicle as in claim 1, wherein said wireless module also carries out communication pairing said cellular phone to said vehicle in a way that allows users to communicate by speaking in said vehicle using hardware in said vehicle, over said cellular phone, wherein said communication pairing is done separately from said access operations that allows said access to said vehicle.

7. A method of obtaining access to a vehicle with wireless entry capability, comprising:

communicating with a first key in a vehicle from a vehicle system; responsive to communicating with the first key in the vehicle, allowing access to the vehicle including entry into the vehicle and operating the vehicle based on said communicating with the first key in the vehicle, wirelessly communicating with at least one cellular phone from the vehicle, only while communicating with the first key in the vehicle, allowing a user to pair a cellular phone with the vehicle, where said cellular phone is paired to the vehicle only while said vehicle is communicating with the first key in the vehicle and where said cellular phone cannot be paired to the vehicle and the key while the vehicle is not communicating with the first key in the vehicle;

storing information indicative of said cellular phone that has been properly paired to the vehicle;

subsequently detecting a proximity of said cellular phone and allowing said access to the vehicle based on detecting said cellular phone within range of said vehicle without communicating with said first key, wherein said allowing the user to pair comprises transferring information that represents a time of a request for access that was indicated by said cellular phone, using a clock running in the vehicle to determine whether the time indicated by said cellular phone matches to the time indicated by the clock in the vehicle, and allowing access only when the cellular phone has been previously paired to the vehicle, and the clock in the vehicle indicated the same time as the information from the request for access from the cellular phone.

8. A method as in claim 7 wherein said first key is a full function key, and further second communicating with a second key which is not a full function key, where said second communicating with said second key allows said access to the vehicle, but does not allow pairing a cellular phone to the vehicle.

9. A method as in claim 7, wherein a communication format of the cellular phone is Bluetooth.

10. A method as in claim 7, wherein said pairing with said cellular phone is carried out over a wire connection, and cannot be carried out wirelessly, and subsequent to said pairing, said access is allowed via a wireless connection.

11. A method as in claim 7, wherein said vehicle includes a location detecting part that determines location, and automatically sends a communication to a remote computer indicative of said location, each time the vehicle is accessed using said cellular phone.

12. A method as in claim 7, further comprising communication pairing said cellular phone to said vehicle in a way that allows users to communicate by speaking in said vehicle using hardware in said vehicle, over said cellular phone, wherein said communication pairing is done separately from said access operation that allows said access to said vehicle.

13. A vehicle with wireless entry capability, comprising:

a communication system, which pairs with and allows access to the vehicle including entry into the vehicle and operating the vehicle based on wireless communication with a cellular phone which has been previously paired to the vehicle, said vehicle and allowing said access by receiving a request for access, obtaining information from said request for access that represents a time of the request for access that was indicated by said cellular phone, using a clock running in the vehicle to determine whether the time indicated by said cellular phone matches to the time indicated by the clock in the vehicle, and allowing access only when the cellular phone has been previously paired to the vehicle, and the clock in the vehicle indicates the same time as the information from the request for access from the cellular phone, wherein said communication system also carries out pairing with the vehicle, and communicating with a first key in the vehicle, and allows said pairing between the cellular phone only while said communication system is communicating with the first key in the vehicle, and where said cellular phone cannot be paired to the vehicle while the vehicle is not communicating with the first key in the vehicle; and after pairing, said communication system storing information indicative of said cellular phone that has been properly paired to the vehicle and subsequently detecting a proximity of said cellular phone and allowing said access to the vehicle based on detecting said cellular phone within range of said vehicle without communicating with said first key.

14. A vehicle as in claim 13, wherein said communication system also carries out communication pairing said cellular phone to said vehicle in a way that allows users to communicate by speaking in said vehicle using hardware in said vehicle, over said cellular phone, wherein said communication pairing is done separately from access operations that allows said access to said vehicle.

15. A vehicle as in claim 13 wherein said first key is a full function key, and wherein said communication system further communicates with a second key which is not a full function key, where said communicating with said second key allows said access to the vehicle, but does not allow pairing said cellular phone to the vehicle for access to the vehicle.

16. A vehicle as in claim 13, wherein said pairing is carried out over a wire connection, and cannot be carried out wirelessly, and subsequent to said pairing, said access is allowed via a wireless connection.

17. A vehicle as in claim 1, wherein said vehicle includes a location detecting part that determines location, and automatically sends a communication to a remote computer indicative of said location, each time the vehicle is accessed using said cellular phone.

* * * * *